US005572624A

United States Patent [19]

Sejnoha

[11] Patent Number: 5,572,624
[45] Date of Patent: Nov. 5, 1996

[54] SPEECH RECOGNITION SYSTEM ACCOMMODATING DIFFERENT SOURCES

[75] Inventor: Vladimir Sejnoha, Cambridge, Mass.

[73] Assignee: Kurzweil Applied Intelligence, Inc., Waltham, Mass.

[21] Appl. No.: 185,500

[22] Filed: Jan. 24, 1994

[51] Int. Cl.[6] .................................................. G10L 9/00
[52] U.S. Cl. ............................................. 395/265; 395/2.6
[58] Field of Search ........................... 395/2.4, 2.6–2.66, 395/2, 2.55, 2.59; 381/43, 41–42

[56] References Cited

U.S. PATENT DOCUMENTS 4,741,036   4/1988   Bahl et al. ............................ 395/2.65

OTHER PUBLICATIONS

Haeb–Umbach et al., "Improvements In Connected Digit Recognition Using Linear Discriminant Analysis And Mixture Densities", ICASSP–93, Apr. 27–30, 1993, pp. 239–242.

Wood et al., "Improved Vocabulary Independent Sub–Word HMM Modelling," ICASSP–91, May 14–17, 1991, pp. 181–184.

Aubert et al., "Continuous Mixture Densities And Linear Discriminant Analysis For Improved Context–Dependent Acoustic Models," ICASSP–93, Apr. 27–30, 1993, pp. 648–651.

Ney, "Experiments On Mixture–Density Phoneme–Modelling For The Speaker–Independent 1000–Word Speech Recognition DARPA Task," ICASSP–90, Apr. 3–6, 1990, pp. 713–716.

Hunt et al., "Speaker Dependent And Independent Speech Recognition Experiments With An Auditory Model," ICASSP–88, Apr. 11–14, 1988, pp. 215–218.

Yu et al., "Discriminant Analysis And Supervised Vector Quantization For Continuous Speech Recognition," ICASSP–90, Apr. 3–6, 1990, pp. 685–688.

Ney et al., "Phoneme Modelling Using Continuous Mixture Densities," ICASSP–88, Apr. 11–14, 1988, pp. 437–440.

R. Duda, P. Hart, "Pattern Classification And Scene Analysis" pp. 118–121, Wiley and Sons, 1973.

M. J. Hunt, C. Lefebvre, "A Comparison of Several Acoustic Representations For Speech Recognition With Degraded and Undegraded Speech", Proc. IEEE Int. Conf. Acoustics, Speech and Signal Processing, Glasgow, Scotland, pp. 262–265, May 1989.

S. A. Zahorian, D. Qian, A. J. Jagharghi, "Acoustic–phonetic Transformations For Improved Speaker–independent Isolated Word Recognition", Proc. IEEE Int. Conf. on Acoustics, Speech and Signal Processing, Toronto, Canada, pp. 561–564, May 991.

R. Haeb–Umbach, H. Ney, "Linear Discriminant Analysis For Improved Large Vocabulary Continuous Speech Recognition", Proc. IEEE Int. Conf. on Acoustics, Speech and Signal Processing, San Francisco, CA, pp. 113–116, Mar. 1992.

G. Strang, "Linear Algebra And Its Applications", pp. 343–345, Harcourt Brace Jovanovich, 3rd Ed., 1988.

Primary Examiner—Allen R. MacDonald
Assistant Examiner—Michael A. Sartori
Attorney, Agent, or Firm—Henry D. Pahl, Jr.

[57] ABSTRACT

The speech recognition system disclosed herein obtains improved recognition accuracy by employing recognition models which are discriminatively trained from a data base comprising training data from different sources, e.g., both male and female voices. A linear discriminant analysis is performed on the training data using expanded matrices in which sources are identified or labelled. The linear discriminant analysis yields respective transforms for the different sources which however map the different sources onto a common vector space in which the vocabulary models are defined.

9 Claims, 3 Drawing Sheets

SPEECH RECOGNITION SYSTEM ACCOMMODATING DIFFERENT SOURCES

BACKGROUND OF THE INVENTION

The present invention relates to speech recognition and more particularly to a speech recognition system which transforms data to improve discrimination and which further allows input from different sources to be transformed onto a common vector space.

The goal of automatic speech recognition (ASR) systems is to determine the lexical identity of spoken utterances. The recognition process, also referred to as classification, begins with the conversion of the acoustical signal into a stream of spectral vectors or frames which describe important characteristics of the signal at specified times. Classification is attempted by first creating reference models which describe some aspect of the behavior of sequences of spectral frames corresponding to different words. A wide variety of models have been developed, e.g., Hidden Markov Models (HMM), but they all share the property that they describe the temporal characteristics of spectra typical to particular words. The sequence of spectra arising from an unknown or input utterance is compared to such models, and the success with which different models predict the behavior of the input frames determines the putative identity of the utterance.

A variety of spectral descriptions have been developed, e.g., filter-banks and linear predictive coding (LPC) spectra, and most share the property that they describe the signal by estimating the energy in different frequency ranges. While speech sounds have characteristic spectral behavior, the classification process is made difficult by the presence of a number of sources of variability. Marked spectral inconsistency can arise, for example, due to the presence of additive background noise, the inconsistency with which a speaker produces the same utterance on different occasions, the dialectal and physiological differences between speakers, including differences due to speaker gender, as well as the differences due to different microphones, preprocessing methods and the acoustic environment.

A separate problem with typical spectral processing is one of efficiency. The components (or channels) of most spectral vectors are not independent and thus the inclusion of the whole vector is in some sense redundant. Since the cost of much subsequent processing is usually influenced by the number of spectral components, the channel correlation can be problematic. The problem is compounded if the basic spectral stream is supplemented by other vector descriptors of the signal, for example various spectral time-derivatives.

Given the joint problems of intrinsic variability and inefficiency of spectral representations, it would be desirable to apply some modification to the spectral vectors so as to minimize the effects of variability on classification accuracy while at the same time improving efficiency of the representation.

It has proved difficult to discover a transformation of this type which would maximize word recognition accuracy. However, methods do exist which improve classification performance on the frame level. The best known such method is Fisher's Discriminant Analysis, also known as Linear Discriminant Analysis (LDA). LDA assumes that a collection of spectral vectors is labeled with a class identity. Each frame-level recognition class is thus associated with a collection of exemplar vectors. It is possible to concisely describe the separability of the classes by deriving an average within-class and an a between-class scatter matrix from the class distributions. The goal of the LDA process is then to obtain a matrix transformation which maximizes the quotient of the between- to within-class scatter matrix determinants, and thus to minimize the within-class variance and maximize the between-class separation.

The LDA transformation consists of a rotation and scaling of the spectral space onto a new set of axes which not only maximize class discriminability but which are also orthogonal and can be ordered according to their contribution to discrimination. The ordering permits the discarding of dimensions which do not contribute significantly to frame-level recognition. This generally improves performance by eliminating variability in the signal, as well as improving the efficiency of the representation.

The LDA method has been applied with some success to the preprocessing of spectral frames in speech recognition. It has been found that it is frequently possible to improve word-level recognition performance in this manner even though the transform is trained at a frame-level.

There are, however, significant problems with the basic LDA procedure. First, the proper definition of frame-level classes is not obvious, given that ultimately the classes of concern are at the word or even sentence level. Second, and more important, is the limitation that LDA can perform only one linear transformation on the signal. The consequence is that a single set of new axes are obtained for the whole data space. However, in typical ASR applications both the training and testing speech data can arise from a number of different sources (e.g., different microphones, speakers of different gender, etc.), whose effect on the speech data can be approximated as a separate rotation and scaling of some underlying but directly inaccessible, pure acoustic manifestation. This means that if considered separately, the data from each distinct source would give rise to a different and incompatible LDA transformation. A single average linear transform which would attempt to accommodate all the sources would produce poor results.

A particular example of a source effect is the difference due to speaker gender. Speech spectra produced by male and female speakers pronouncing the same phonetic target can differ considerably due to the distinct physiology of the vocal tract. It is known that gender differences in spectra involve a frequency shift, but the relationship is thought to be quite complex and has not yet been adequately characterized. Including the spectra from both genders in the LDA frame-level classes considerably increases the within-class variance and class overlap and makes it more difficult to find an effective set of new axes.

A similar problem may arise if portions of the training and testing data have been processed with dissimilar front ends, including filter-banks and microphones, as well as dissimilar acoustic environments (e.g., quiet vs. noisy).

Improved performance can be achieved if the heterogeneous data are kept separate and a specific LDA transform is obtained for each set. This solution, however, is not acceptable for two reasons. First, doing so effectively reduces the amount of data available for training. Recognition performance is closely tied to the quantity of training data and reducing this amount is undesirable. Second, training source-specific transforms separately would mean that the data from each source would then be mapped onto a unique and mutually incompatible set of output dimensions, with the consequence that a separate set of reference models would have to be produced for every condition. In a large vocabulary system this may entail a great deal of storage space and unacceptable delays due to having to reload reference models if the source changes.

Among the several objects of the present invention it may be noted the provision of a speech recognition system providing increased accuracy of recognition; the provision of such a system which accommodates input from different sources, e.g., male and female speakers; the provision of such a system which employs a vocabulary of models which are relatively compact; the provision of such a system in which vocabulary models are trained using data from a variety of sources; the provision of such a system which is highly reliable and which is of relatively simple and inexpensive implementation. Other objects and features will be in part apparent and in part pointed out hereinafter.

SUMMARY OF THE INVENTION

In the practice of the present invention, vocabulary models are trained from multiple sources, e.g, male and female voices, by applying respective transforms to each source to map the training data onto a common vector space. The transforms are developed in an iterative process in which multi-phone models, corresponding to multi-phone elements in the training data are trained. Each multi-phone model comprises a sequence of states with each state from each model defining a class. Preferably, the multi-phone models are transitional diphones. The training data is labelled with source and class identifiers and source specific statistics are accumulated identifying within class and between class variances. The training data statistics from across all sources are combined using expanded matrices and a composite eigenvector matrix is generated from those expanded matrices. The composite eigenvector matrix is split into sections corresponding to the respective sources for use in transforming the speech data obtained from those sources on successive iterations of the training of the multi-phone models. When the transform matrices have converged, vocabulary models are generated and stored using the most recently obtained transforms. During recognition, speech to be recognized from a given source is transformed using the corresponding eigenvector matrix section to effectively map that input data onto the common space employed by the vocabulary models.

DESCRIPTION OF THE PREFERRED EMBODIMENT

As indicated previously, the present invention is particularly concerned with the provision of improved vocabulary models and the provision of source specific transforms which adapt speech input from different sources onto a common vector space employed by the models. At the outset however it is appropriate to describe in general terms the type of speech recognition system to which the present invention is applicable.

Figure 1:
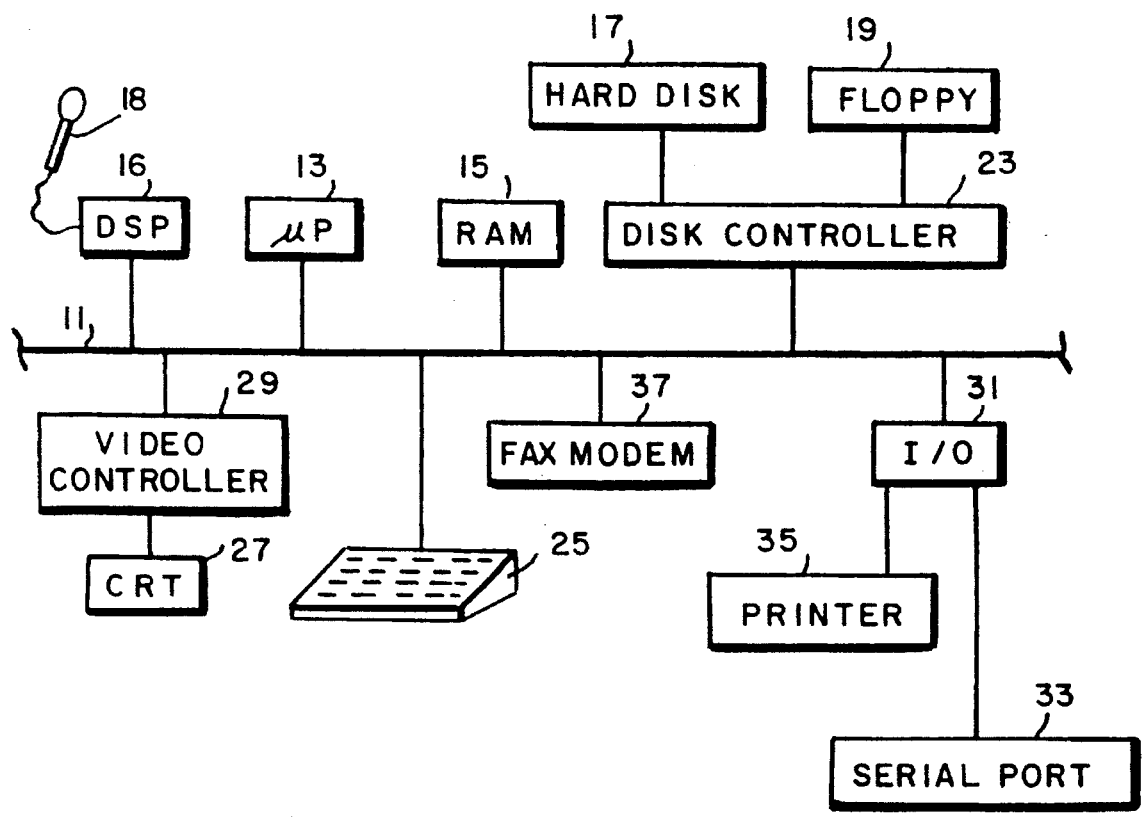
FIG. 1 is a speech rendition system which accommodates

Referring now to FIG. 1, the computer system illustrated there is of the type generally referred to as a personal computer. The computer runs under the MS DOS operating system and is organized around a system bus, designated generally by reference character 11. The system bus may be of the so called EISA type (Extended Industry Standards Association). The computer system utilizes a microprocessor, designated by reference character 13, which may, for example, be an Intel 486 type processor. The system is also provided with an appropriate amount of local or random access memory, e.g., 16 megabytes, designated by reference character 15. Additional storage capacity is provided by a hard disk 17 and floppy diskette drive 19 which operate in conjunction with a controller 23 which couples them to the system bus.

User input to the computer system is conventionally provided by means of keyboard 25 and feedback to the user is provided by means of a CRT or other video display 27 operating from the bus through a video controller 29. External communications may be provided through an I/O system designated by reference character 31 which supports a serial port 33 and a printer 35. Advantageously, a fax modem may be provided as indicated by reference character 37. This is particularly useful for forwarding structured medical reports as described in co-assigned U.S. Pat. No. 5,168,548.

To facilitate the use of the computer system for speech recognition, a digital signal processor is provided as indicated by reference character 16, typically this processor being configured as an add-in circuit card coupled to the system bus 11. As is understood by those skilled in the art, the digital signal processor takes in analog signals from a microphone, designated by reference character 18, converts those signals to digital form and processes them e.g., by performing a Fast Fourier Transform (FFT), to obtain a series of spectral frames which digitally characterize the speech input at successive points in time.

The basic speech recognition system operates as follows. A series of spectral frames representing a new utterance is compared with tokens or models representing corresponding vocabulary words to be recognized. During the recognition process itself, the tokens or models will typically be stored in the random access memory 15 having been previously transferred from the hard disk 17. In the particular embodiment being described, each model comprises a sequence of probability distribution functions (PDFs). As is understood in the art, a probability distribution function describes the likelihood of finding a given spectrum at the corresponding point in time in the spoken vocabulary word. Other types of encoding of the vocabulary, e.g. linear predictive encoding, might also be used but, in general, the models will comprise sequences of states against which the series of spectral frames are compared to generate values or scores each of which indicates the likelihood of match of the new spoken utterance with the corresponding model. As is also understood, various time aligning functions will also be applied so that a best alignment is obtained between each model and the incoming speech to be recognized.

The basic speech recognition system ranks the scores for the different active tokens and identifies the best scoring token, i.e. the vocabulary word most likely to correspond with the utterance which is to be recognized. Typically, the basic speech recognition system will also identify a list of alternate words, i.e. words which also correspond well with the utterance to be recognized. The collection of likely words are typically referred to as candidates.

As indicated previously, one aspect of the present invention involves the application of a source specific transform to the data representing an utterance so as to map that data onto a vector space in which the models are represented. The source specific transforms are preferably generated from the same training data which is used to generate the vocabulary models. The generation and training of the transforms involves a novel form of linear discriminate analysis as described in greater detail hereinafter. However, at the outset it is useful to describe standard linear discriminant analysis.

Standard Linear Discriminant Analysis

The standard Linear Discriminant Analysis procedure begins with the labeling of a set of d-dimensional training spectral-frame vectors x[t] with C class labels, where x[t] denotes the t-th training frame. All the vectors with the same label are deemed to describe a particular acoustic event. For example, in a simple vowel classification experiment, each class could represent a different steady-state vowel. The collection of vectors belonging to a particular class, can be modeled by a variety of probabilistic distributions which describe the probability of observing any of these vectors given the class. A common, mathematically tractable class model is the multivariate normal or Gaussian density of the form:

$$p(x[t]) = \frac{\exp[-1/2 \, (x[t] - u)^t \, Cov^{-1} \, (x[t] - u)]}{(2\pi)^{d/2} \, |Cov|^{1/2}}$$

where x[t] is a d-component column vector, u is a d-component mean vector, Cov is the d-by-d covariance matrix, $(x[t]-u)^t$ is the transpose of $(x[t]-u)$, $Cov^{-1}$ is the inverse of Cov, and |Cov| is the determinant of Cov. The covariance is defined as follows:

$$Cov = \frac{1}{n} \sum_t (x[t] - u)(x[t] - u)^t$$

where n is the number of training samples which belong to this distribution.

The classification performance on a new set of test vectors is affected by the amount the overlap between the class distributions.

The goal of Linear Discriminant Analysis to derive a transformation of the vector space which will decrease the overlap of the class distributions and thus increase the correct classification rate.

The first step is to define a criterion function which expresses the separability of the set of classes. A convenient form is the ratio of a measure of the average separation of the class means to a measure of the average within-class separation, or 'scatter'. The average within-class scatter WSc is obtained by averaging the class-specific scatter matrices Sc[c]:

$$WSc = \sum_c^C Sc[c]$$

where Sc[c] is equal to the unnormalized class covariance matrix and is given by the following sum over all x[t] which belong to class c:

$$Sc[c] = \sum_t (x[t] - u[c])(x[t] - u[c])^t$$

where u[c] is the mean vector of the c-th class. The separation of the class means, also referred to as the between-class scatter matrix BSc, is given by:

$$BSc = \sum_c^C n[c] (u[c] - u)(u[c] - u)^t$$

where u is the total mean vector and n[c] is the number of training observations for the c-th class. It can be shown that:

$$BSc = GSc - WSc$$

where GSc is the grand scatter matrix computed from all vectors x belonging to all the classes. The separability criterion J then becomes:

$$J = \frac{|BSc|}{|WSc|}$$

It is postulated that there exists a d-by-d matrix W, the application of which to the observation vectors will maximize J. Thus $$y = W^t x$$

Let the average within- and between-class scatter matrices computed from the transformed vectors y be $\widetilde{WSc}$ and $\widetilde{BSc}$. It can be shown [1] that $\widetilde{WSc} = W^t \, WSc \, W$, and $\widetilde{BSc} = W^t \, BSc \, W$. The criterion thus becomes:

$$J(W) = \frac{|W^t \, BSc \, W|}{|W^t \, WSc \, W|}$$

The expression J(W) is known as the generalized Rayleigh quotient, and the columns of the optimal matrix W are the generalized eigenvectors in the following expression:

$$BSc \, w[i] = L[i] \, WSc \, w[i]$$

Where L[i] is the i-th eigenvalue and w[i] is the i-th column of W and corresponds to the i-th eigenvector. Typically, only those eigenvectors that correspond to the largest eigenvalues are retained and are used to multiply observation vectors x. In this manner a dimensionality reduction is attained.

The Problem with Different Sources

As indicated previously, a straightforward approach to improving the recognition accuracy of utterances from different sources would be to apply conventional linear discriminant analysis separately to the training data obtained from each type of source. As noted however, that approach is disadvantageous for two reasons. First, it effectively reduces the amount of data available for training. Secondly, source specific transforms so obtained would map data from each source onto its own set of output dimensions which would be incompatible with those from other sources. Accordingly, a second set of reference models would have to be provided for each type of source.

The linear discriminant analysis procedure utilized in generating the transforms employed in the practice of the present invention differs from conventional linear discriminant analysis as applied to frame level speech recognition in at least two major respects. Firstly, the procedure utilizes the augmentation of the training vectors to include labeling as to source. Accordingly, training data statistics from across all sources can be combined using the expanded matrices and a composite eigenvector matrix can be generated from the expanded statistical matrices. Secondly, rather than training up the transforms at a straight forward frame level, the present invention utilizes transitional diphones so as to effectively utilize information reflecting contextual variations while maintaining computational requirements within reasonable bounds.

Briefly stated the multisource normalization employed in the practice of the present invention may be described as follows.

In order to find a transform solution which maps spectra from different sources onto a common space, data from all the sources must be included in the within-class scatter matrices. However, the frames contributing to a given scatter matrix, but belonging to distinct sources, must somehow be distinguishable from each other so that source-specific transformations can be derived.

These two requirements are met by an augmentation of the d-dimensional training vectors x[t]. If the training vectors arise from S distinct sources [0,S−1], the augmented vector z[t] will have (d*S) dimensions. If x[t] arises from source s, z[t] will be all zero with the exception of locations s to s+d−1, which will contain the values of the original vector x[t]. The effect of each source can thus be viewed as a mapping of the signal onto a new set of unique dimensions which are independent of the dimensions used by the other sources.

In this manner the vectors x[t] which belong to a particular class but which arise from several sources are maintained separately within a single composite vector. This operation is illustrated in the example below, which assumes 3-dimensional input vectors x and 2 possible sources s. Note that for convenience the vectors are shown transposed:

| | |
|---|---|
| [ x1, x2, x3 ] | input vector x[0], source s = 0 |
| [ x1, x2, x3, 0, 0, 0 ] | augmented vector z[0] |
| [ x4, x5, x6 ] | input vector x[1], source s = 1 |
| [ 0, 0, 0, x4, x5, x6 ] | augmented vector z[1] |

The augmented vectors can then be processed in the standard manner. The (d*S)-by-(d*S) average within-class and (d*S)-by-(d*S) between-class scatter matrices can be obtained and the eigenvector matrix can be computed by solving the generalized eigenvalue problem. The resulting eigenvector matrix would also be of size (d*S)-by-(d*S). Each column represents a single eigenvector and these can be ordered by descending eigenvalue. Only a small number of the eigenvectors corresponding to the biggest eigenvalues are typically retained, and thus the effective matrix size is (d*S),p, where p is the number of retained output dimensions. Each eigenvector contains (d*S) elements, which corresponds to the dimensions of the augmented input vector.

The transformation of an input vector x belonging to a given source s is simple—the components of x are multiplied by each eigenvector entries staring with index (s,d) and ending with index (s*(d+1)). Actual augmentation during recognition is thus not necessary.

The Diphone Model

The selection of an appropriate set of classes for the labeling of LDA training data is subject to two constraints. The first is that the classes at this stage should reflect distinctions which will be relevant during actual recognition, and the second is that, given a finite amount of training data, the number of training classes must be sufficiently small to permit reliable estimation of the class scatter matrices.

A single class should group together spectral vectors associated with a narrowly defined acoustic-phonetic state, so that the differences between the members of the class are due to intra- and inter-speaker variability and source differences, rather than differences due to phonetic identity or contextual coloring. In most recognition systems speaker and source differences are regarded as 'noise' which is to be minimized, while subtle phonetic distinctions need to be preserved.

The successive temporal states of phonetic Hidden Markov Models are good candidates for the LDA classes. However, because the acoustic manifestations of phonemes are strongly influenced by the surrounding phonetic context, context independent models are not satisfactory. Among possible choices of context dependent models, the commonly used triphone model also suffers from several drawbacks. The first is that the large repertory of triphones does not allow for sufficiently reliable training. The second problem is that the standard triphone model has a fixed number of internal states for all phonemes in all contexts. This means that in many instances dissimilar phonetic events would be forced into a single class, thus violating one of the basic criteria for class definition.

The class model preferably used in this invention which solves the above problems is a variable-duration diphone HMM. A diphone model extends from the 'center' through the right half of phone A, through a transition, includes the left half of the following phone B and stops at the center of the phone B. A word consisting of the phones A B C would thus be expressed in terms of diphones as sA AB BC Cs, where sA is a silence-A diphone. The diphone model captures most of the important coarticulation between phones and has the advantage that the total number of models is significantly smaller than the number of triphones, i.e., approximately 1/10 the number.

Each diphone model is assigned a number of internal states which is appropriate for the specific phonetic context. In general, the number of states is equal to the average number of sequential spectral vectors which are aligned with each model during training, resulting in approximately 16000 total states. The models chosen for this stage were standard continuous density HMMs, with each state associated with a single Gaussian probability density function of the observed vectors x[t]. No transition probabilities were trained and Viterbi decoding was used. It should be noted that the details of these models are not important and a variety of alternative models would be satisfactory, provided they represent diphones and that the number of distinct internal probability density functions is equal to the average duration of the training data.

The diphone models are trained by the standard iterative estimate-maximize procedure, where training data is repeatedly aligned against an appropriate sequence of diphone models, given the current set of model parameters. The new associations of data frames and states are used to compute a new set of model parameters. Once the training has converged, each training data frame is labeled with a unique state number, corresponding to the diphone state to which it has been aligned and indicating the 'class' membership of the frame. An index identifying the source of each frame is stored alongside the class label. A two-field label vector Lab[t]=(s,c) is thus associated with each data vector x[t]. For example, if the data included male and female speech recorded with two different microphones there would be 4 sources: male/mike1, male/mike2, female/mike1 and female/mike2.

Figure 2:
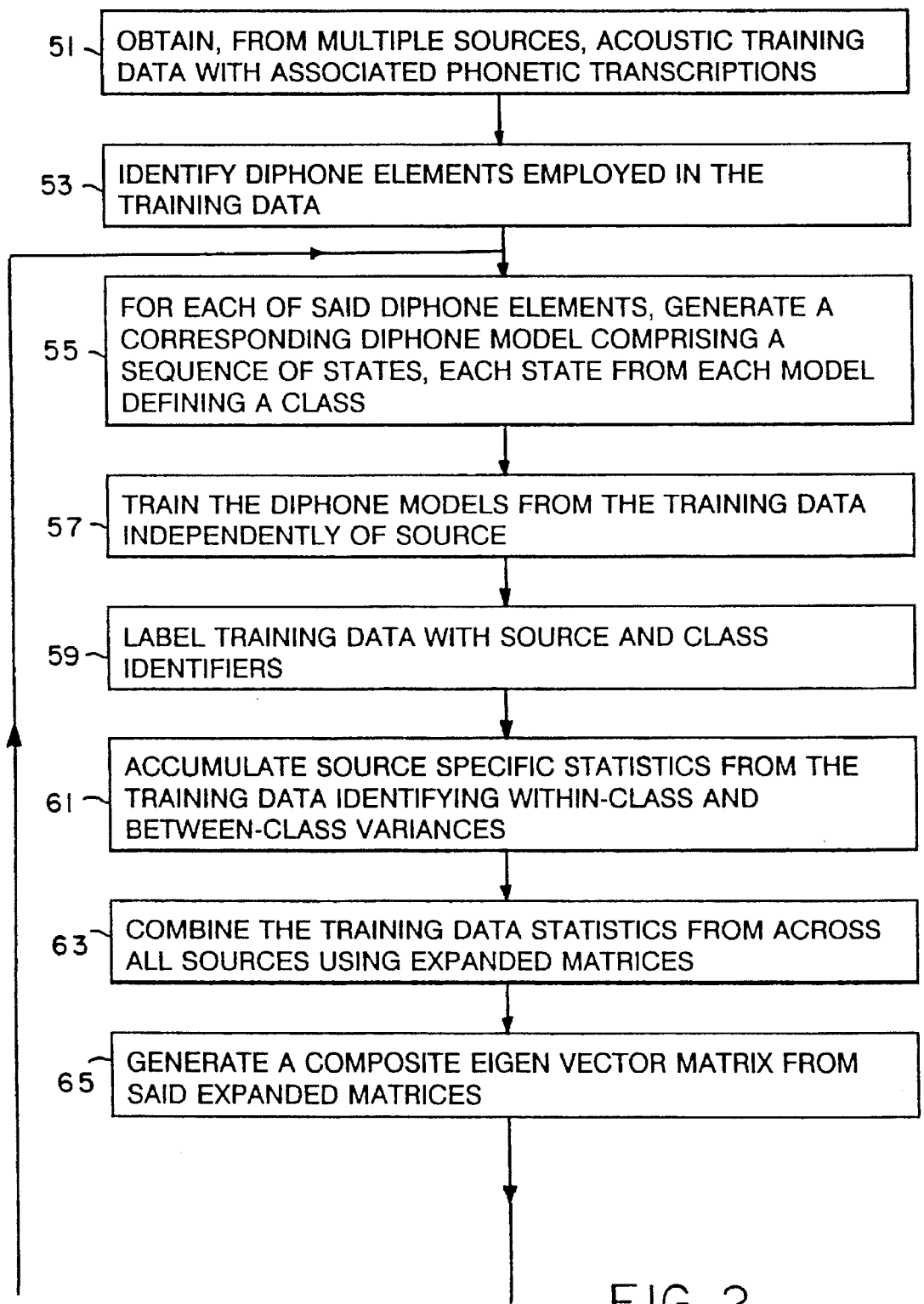
FIGS. 2 and 3 are a flow chart illustrating a method of generating and using vocabulary models in accordance with the present invention.
Figure 3:
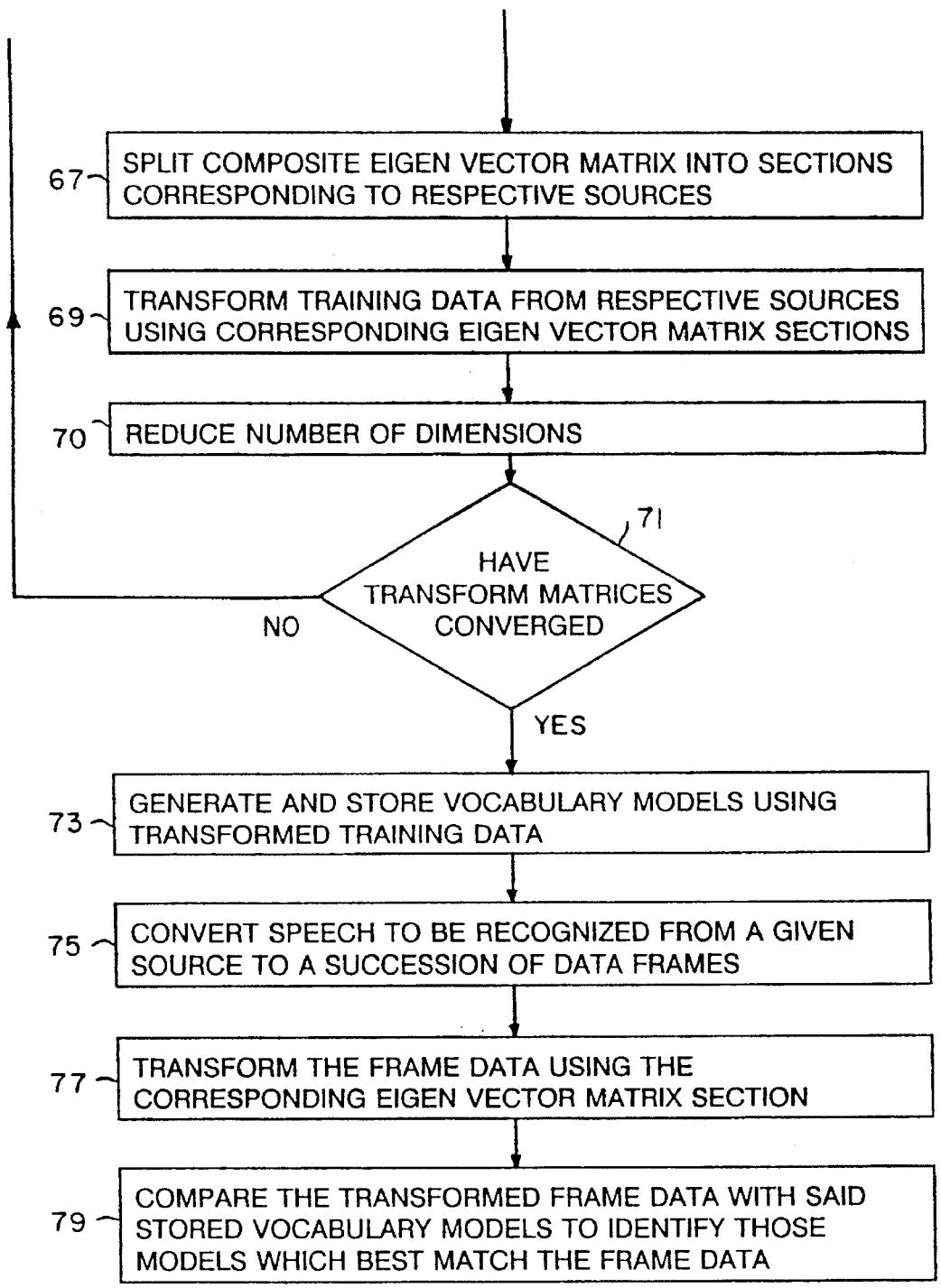

With reference to FIG. 2, the foregoing process may be described as follows. Acoustic training data is obtained from multiple sources, e.g., male and female speakers, with associated phonetic transcriptions, as indicated at block 51. As is understood the phonetic descriptions are generated from the text which the speakers training the systems read during the training sessions. The phonetic transcriptions are then in essence broken down into diphone elements as indicated at block 53.

For each of these diphone elements a model is generated, i.e., a Hidden Markov Model as described previously and the models are trained from the training data independently of source, as indicated at step 57. In the first pass the models are trained from the original or untransformed training data. However, on subsequent passes the training is based on transformed data as described in greater detail hereinafter. As indicated previously, each model will comprise as sequence of states and, for use in the linear discriminant analysis described hereinafter, each state from each model defines a class. By using the transitional diphone models as described previously, the number of classes is held to reasonable bounds, e.g., approximately sixteen thousand. As also described previously, the training data is labelled with source and class identifiers and indicated at block 59.

As indicated previously in the brief description of the multisource normalization, source specific transformations are generated using a linear discriminant analysis based on expanded matrices. While the steps involved are described in greater detail hereinafter, the following brief description can be related to the flow chart of FIG. 2.

Source specific statistics are accumulated from the training data identifying within class and between class variances as indicated at block 61. The training data statistics are then combined from across all sources using expanded matrices as indicated at block 63. As indicated at block 65, a composite eigenvector matrix is then generated from the statistics matrices. The thereby generated composite eigenvector matrix is split into sections corresponding to respective sources as indicated at block 67 and, for use in the next iteration, the training data from respective sources is transformed using the corresponding eigenvector matrix sections, as indicated at block 69. The detailed procedures performed during the steps of blocks 61–69 are as follows.

Once the training data has been labeled with class and source indices, it is possible to compute the within-class and between-class scatter matrices. The direct approach would be to first augment each d-dimensional training vector $x[t]$ to form a $(d*S)$-dimensional vector $z[t]$, and to accumulate C matrices (corresponding to the C classes) of size $(d*S)$-by-$(d*S)$. This is potentially unmanageably large, and so instead, a more efficient implementation has been adopted, in which source-specific, non-augmented structures are accumulated and the results are augmented prior to the computation of the average scatter matrices WSc and BSc. In this way, $(S*C)$ matrices of size $(d*d)$ are accumulated, resulting in a savings of a factor of S over the direct approach. The following intermediate structures are thus accumulated from the labeled training data:

$$Count[s][c]$$

$$Sum[s][c][i] = \sum_t x[t][i]$$
$$s.t. \; Lab[t] = (s,c)$$

$$SumSq[s][c][i][u] = \sum_t (x[t][i] * x[t][j])$$
$$s.t. \; Lab[t] = (s,c)$$

where $Count[s][c]$ is the number of data frames $x[t]$ belonging to class c, with source label s (i.e., with label $Lab[t]=(s,c)$).

$Sum[s][c][i]$ is the sum of the i-th component (out of d) of all the vectors $x[t]$ which belong to class c and source s. $Sum[s][c]$ is thus a d-component vector. $SumSq[s][c][i][j]$ is the sum of the products of the i-th and j-th components of all the vectors $x[t]$ which belong to class c and source s. $SumSq[s][c]$ is thus a d-by-d matrix.

At this point the contributions from the individual classes are normalized by the total number of class observations and then augmented. The normalization ensures that all acoustic classes have an equal influence on the solution, rather than being arbitrarily weighted by the number of occurrences of each class in the training data. Thus:

$$ASum[c][i + (s*d)] = \frac{Sum[s][c][i]}{Count[s][c] * S}$$

$$ASumSq[c][i + (s*d)][j + (s*d)] = \frac{SumSq[s][c][i][j]}{Count[s][c] * S}$$

$ASum[c]$ is thus a vector of size $(S*d)$, containing all zeros except in the range $(s*d)$ to $(s*d+d)$. $ASumSq[c]$ is a $(S*d)$-by-$(S*d)$ matrix.

Once the augmented structures have been computed, it is possible to obtain WSc and BSc. This is done in the following steps:

$$TotSum[i] = \sum_c^C ASum[c][i]$$

$$TotSumSq[i][j] = \sum_c^C ASumSq[c][i][j]$$

$$WSc[i][j] = \frac{1}{C} \sum_c^C \{ASumSq[c][i][j] - (ASum[c][i] * ASum[c][j])\}$$

$$GSc[i][j] = \frac{1}{C*C} * \{C * TotSumSq[i][j] - (TotSum[i] * TotSum[j])\}$$

$$BSc[i][j] = GSc[i][j] - WSc[i][j]$$

To obtain the eigenvectors and eigenvalues the two-matrix generalized eigenvalue problem must be solved for the following equation:

$$BSc \; w[i] = L[i] WSc \; w[i]$$

where $w[i]$ is the column eigenvector corresponding to the i-th eigenvalue $L[i]$. For conciseness the i subscript is dropped from the equations below.

The solution to this problem involves well-known techniques. Consequently, only a general outline of the procedure is given here.

Since WSc is positive definite, it can be split into $R' R$, yielding $$BSc \; w = L \; R'R \; w$$

The substitution $v = R \; w$ further changes the above equation to $$BSc \; R^{-1} v = L \; R^t v$$

Writing D for $R^{-1}$, and multiplying throughout by $(R')^{-1} = D^t$, this becomes a standard eigenvalue problem for a single, symmetric matrix D BSc D:

$$D^t BSc \; D \; v = L \; v$$

The eigenvalues are the same as for the original equation $BSc \; w = L \; WSc \; w$, and the eigenvectors are related by $v = R \; w$.

The full eigenvector matrix is of size $(S*d)$-by-$(S*d)$. Its columns are the eigenvectors, and they can be ordered by the corresponding eigenvalue so that the left most corresponds to the largest eigenvalue. The larger the eigenvalue, the more discriminative the direction represented by the eigenvector. Generally, only a relatively small number $p < (S*d)$ are retained. The remaining eigenvectors contribute little to discrimination and their inclusion can actually hurt performance since they essentially represent the noisy components of the original signal.

The final transform matrix W thus consists of p column vectors of size (S*d). Each d-sized segment of each eigenvector corresponds to a different source. The augmenting of an input spectral vector before multiplication by the eigenvector matrix is equivalent to simply selecting that portion of each eigenvector which is appropriate for the input source, as shown in the example below (d=4, S=2). Note that for convenience the vectors and eigenvector matrix are shown transposed:

$$\text{Source 0:} \quad [x1 \ x2 \ 0 \ 0] \quad \begin{vmatrix} w11 & w12 & & w1p \\ w21 & w22 & & w2p \\ w31 & w32 & \ldots & w3p \\ w41 & w42 & & w4p \end{vmatrix}$$
$$\text{Source 1:} \quad [0 \ 0 \ x3 \ x4]$$

The eigenvector matrix can be split into S d-by-p individual transform matrices obviating the need to augment input spectral vectors during recognition. Instead, an input vector x[t] corresponding to source s is multiplied by the s-th transform matrix:

$$\text{Source 0:} \quad [x1 \ x2] \quad \begin{vmatrix} w11 & w12 & \ldots & w1p \\ w21 & w22 & & w2p \end{vmatrix}$$

$$\text{Source 1:} \quad [x3 \ x4] \quad \begin{vmatrix} w31 & w32 & \ldots & w3p \\ w41 & w42 & & w4p \end{vmatrix}$$

Once a set of source-specific transforms have been computed, it is desirable to retrain the diphone models which are used to label the frames. The training data is transformed and the parameters of the model states are reestimated. As before, a single multi-variate Gaussian pdf is used, although the transformed data has only p dimensions, compared to the d dimensions of the original untransformed data.

The retraining is an important step because the removal of a significant amount of variability from the training vectors improves the data-to-model alignments. The new alignments lead to a new set of class memberships and thus also to a new set of transforms. The process is repeated until convergence is reached. This iteration is represented at block 71 in FIG. 2. Convergence can be monitored either by computing the percent improvement in the data-to-model cumulative probability across the iterations, or preferably by evaluating the transforms on an independent recognition test.

As will be understood from the foregoing, the source specific transforms generated in this manner operate to transform raw input data obtained from a particular source onto a common vector space. Accordingly, using the same or additional training data, word models can be generated in the same vector space and these models can be trained using the entire base of training data from each source being transformed by a respective one of the transforms. By combining the data from multiple sources the full database of available training data can be utilized to provide well trained and highly accurate models. This step is indicated at block 73 in FIG. 2.

As is understood, the accumulation of training data from multiple sources, the generation of transforms in accordance with the practice of the present invention, and the generation of vocabulary models using transformed training data are all procedures which are performed prior to the actual work of speech recognition. As is understood, these procedures can be performed "off line" and using computational facilities different from those which are used during the speech recognition process itself, e.g., the apparatus illustrated in FIG. 1.

Once the vocabulary has been built up and the models suitable trained, as indicated at block 73, they can loaded into the system or systems which are to perform the actual work of speech recognition. As is understood, the vocabulary will typically be loaded as a file onto the hard disk 17 of the computer system of FIG. 1. During the speech recognition process the speech to be recognized from a given source is converted to a succession of data frames as indicated at block 75. However, prior to comparing the framed data with the vocabulary models, the framed data is transformed using the respective eigenvector matrix section corresponding to the given source as indicated at block 77. As indicated previously this maps the data representing the input utterance onto the same vector space as the models and they can thus be compared, as indicated at block 79, to identify those models which best match the frame data.

Since the respective transforms for the different sources all map incoming utterance data onto the same vector space, it is not necessary to provide different vocabulary models for each of the different sources. Rather, to switch from one source to another, e.g., from a male speaker to a female speaker, it is only necessary to switch the transform being used so as to correspond with the new source. Further, since training data from all different sources can be used in generating the vocabulary models they tend to be well trained and accurate so as to provide improved recognition as compared with models generated with untransformed training data or with the limited amount of data available from a single source, i.e, a particular speaker or class of speakers.

Further, since the application of the transformation also allows for the reduction in the number of dimensions, the models can be more compact and occupy less memory space.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A computer implemented method for generating translations from speech which accommodates different sources using a common set of vocabulary models, said method comprising:

a) inputting, from multiple sources, acoustic training data with associated phonetic transcriptions;

b) identifying multi-phone elements employed in said training data;

c) for each of said multi-phone elements, generating a corresponding multi-phone model comprising a sequence of states, each state from each model defining a class;

d) training said multi-phone models from said training data independently of source;

e) labeling training data with source and class identifiers;

f) accumulating source specific statistics from said training data identifying within-class and between-class variances;

g) combining said training data statistics from across all sources using expanded matrices;

h) generating a composite eigen vector matrix from said expanded matrices;

i) splitting said composite eigen vector matrix into sections corresponding to respective sources for use in transforming speech data obtained from the respective sources;

j) transforming training data from respective sources using corresponding eigen vector matrix sections;

k) repeating steps c through j using transformed training data for step d until transform matrices converge;

l) generating and storing vocabulary models using transformed training data;

m) converting speech to be recognized from a given source to a succession of data frames;

n) transforming the frame data using the corresponding eigen vector matrix section obtained in step i; and o) comparing the transformed frame data with said stored vocabulary models to identify those models which best match the frame data.

2. A computer method as set forth in claim 1 wherein said multi-phone elements are diphones representing the transition from the midpoint of a first phone occurring in the data to the midpoint of the next phone occurring in the data.

3. A computer method as set forth in claim 1 wherein said multi-phone models are Hidden Markov Models.

4. A computer method as set forth in claim 1 wherein said states are probability distribution functions.

5. A computer method as set forth in claim 1 wherein said step j further comprises ordering the components of said eigen vector sections and reducing the number of dimensions in the transformed data.

6. A computer implemented method for generating translations from speech from different sources, said method comprising:

a) inputting acoustic training data with associated phonetic transcriptions;

b) identifying transitional diphone elements employed in said training data which span from the middle of one phone to the middle of the next phone.

c) for each of said diphone elements, generating a corresponding diphone model comprising a sequence of states, each state from each model defining a class;

d) training said diphone models from said training data;

e) labeling training data and class identifiers;

f) accumulating statistics from said training data identifying within-class and between-class variances and combining said training data statistics from across all sources using expanded matrices;

g) generating composite eigen vector matrix from said expanded matrices and splitting said composite eigen vector matrix into sections corresponding to respective sources;

h) transforming said training data using respective sections of said eigen vector matrix and reducing the number of dimensions;

i) repeating steps c through h using transformed training data for step d until transform matrices converge;

j) generating and storing vocabulary models using transformed training data;

k) converting speech to be recognized to a succession of data frames;

l) transforming the frame data using the eigen vector matrix obtained in step g; and m) comparing the transformed frame data with said stored vocabulary models to identify those models which best match the frame data.

7. A computer method as set forth in claim 6 wherein the multi-phone models generated in step c are Hidden Markov Models.

8. A computer method as set forth in claim 6 wherein said states are probability distribution funtions.

9. A computer implemented method for generating translations from speech, which accomodates different sources using a common set of vocabulary models, said method comprising:

a) inputting from multiple sources, acoustic training data with associated phonetic transcriptions;

b) identifying transitional diphone elements employed in said training data which span from the middle of one phone to the middle of the next phone;

c) for each of said diphone elements, generating a corresponding diphone model comprising a sequence of states, each state from each model defining a class;

d) training said diphone models from said training data independently of source; labeling training data with source and class identifiers;

f) accumulating source specific statistics from said training data identifying within-class and between-class variances;

g) combining said training statistics from across all soures using expanded matrices;

h) generating a composite eigen vector matrix from said expanded matrices;

i) splitting said composite eigen vector matrix into sections corresponding to respective sources for use in transforming speeh data obtained from the respective sources;

j) transforming training data from respective sources using corresponding eigen vector matrix and reducing number of dimensions;

k) repeating steps c through j using transformed training data for step d until transform matrices converge;

l) generating and storing vocabulary models using transformed training data;

m) converting speech to be recognized from a given source to a succession of data frames;

n) transforming the frame data using the corresponding eigen vector matrix section obtained in step i; and o) comparing the transformed frame data with said stored vocabulary models to identify those models which best match the frame data.

* * * * *

UNITED STATES PATENT AND TRADEMARK OFFICE
CERTIFICATE OF CORRECTION

PATENT NO. : 5,572,624

DATED : November 5, 1996

INVENTOR(S) : Vladimir Sejnoha

It is certified that error appears in the above-indentified patent and that said Letters Patent is hereby corrected as shown below:

Column 3, line 44, "rendition" should be --recognition--; and at end of same line, after "accommodates", insert --input from different sources in accordance with the present invention;--.

Column 7, at the beginning of line 41, "(d*S),p" should be --(d*S)*p,--; line 47, "index (s,d)" should be --index (s*d)--.

Column 9, line 59, (latter part of formula), "SumSq[s][c][i][u]" should be --SumSq[s][c][i][j]--.

Claim 6, Column 13, line 52, after "generating" but before "composite", insert --a--.

Claim 9, Column 14, line 28, after "source;" but before "labeling", begin a new paragraph and insert --e)--.

Signed and Sealed this

Twenty-second Day of July, 1997

*Attest:*

BRUCE LEHMAN

*Attesting Officer*  *Commissioner of Patents and Trademarks*